June 29, 1926.

G. H. PETERSEN

WEIGHT GAUGE

Filed Sept. 19, 1923

1,590,544

INVENTOR
GEORGE H. PETERSEN
BY
ATTORNEY

Patented June 29, 1926.

1,590,544

UNITED STATES PATENT OFFICE.

GEORGE H. PETERSEN, OF VISALIA, CALIFORNIA.

WEIGHT GAUGE.

Application filed September 19, 1923. Serial No. 663,589.

My invention is an improved load indicator, particularly applicable to automobile trucks.

Most States have a law which prohibits trucks using the highways if they weigh above a specified amount. It is always inconvenient and sometimes impossible for truck drivers to drive upon scales to determine the weight of their machine when loaded. The weight of the machine being constant the amount of depression of the springs will give an accurate indication of the load carried in the body.

The object of my invention is to provide an indicator which will show the amount of depression of the springs and consequently indicate the load in the body.

Another object of my invention is to provide an indicator which is simple in construction, inexpensive to manufacture, and efficient in operation.

In the annexed drawing in which my invention is illustrated, I have shown the preferred form, but it may also be embodied in other forms, and in this application, I desire to cover my invention in whatever form it may be embodied.

Figure 1:
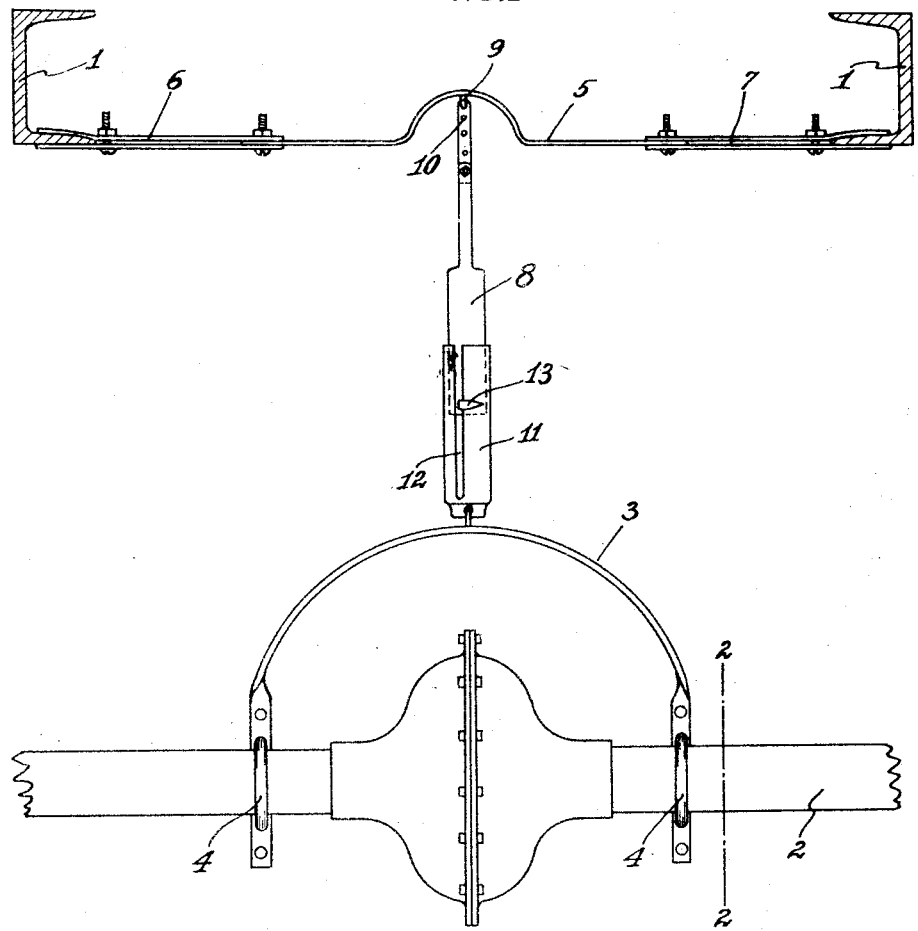
Figure 1 is a rear view of my indicator in position on a truck.
Figure 2:
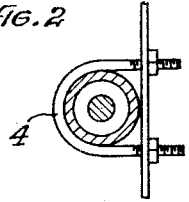
Figure 2 is a sectional view taken on the line 2—2 of Figure 1.

Referring more particularly to the drawing, numeral 1 indicates truck frame, and 2 the rear axle of the truck. An arcuate frame 3 is secured to the rear axle by means of U bolts 4—4, or any other suitable means.

A horizontal plate 5 is secured between the frame 1 by means of clamps 6 and 7 secured to the end thereof. An indicating finger 8 is adjustably secured to the plate 5, this adjustment comprising a J-shaped bolt 9 which is adapted to enter holes 10 in said finger. A sleeve 11 is secured to the frame 3 and has a slot 12 formed therein in which slot a pointer 13 is adapted to enter. The finger 8 is adapted to reciprocate within the sleeve 11, and the pointer 13 is positioned over the rear surface of said sleeve.

It is readily seen that a suitable mark may be placed upon the sleeve 11, which indicates the maximum load, i. e., the maximum depression of the springs, which the truck will stand.

Any desired scale or graduations may be placed upon the sleeve 11 to indicate various loadings of the truck.

Having described my invention, I claim:

A vehicle attachment comprising an arcuate element secured to the rear axle housing of the vehicle on opposite sides of the differential housing so as to extend upwardly, a transverse element bridging longitudinal frame members of the vehicle and disposed vertically above the arcuate element and two telescoping members having their free ends secured to the said two elements, one of the telescoping members having a pointer projecting through and riding in a longitudinal slot in the other element.

In testimony whereof I affix my signature.

GEORGE H. PETERSEN.